United States Patent Office

3,184,302
Patented May 18, 1965

3,184,302
PROCESS, REMOVAL OF OXYGEN AND ALUMINUM FROM METALS PREPARED BY ALUMINOTHERMIC AND SIMILAR PROCESSES
Carl J. Chindgren, Salt Lake City, Utah, assignor to the United States of America as represented by the Secretary of the Interior
No Drawing. Filed Jan. 24, 1963, Ser. No. 253,773
21 Claims. (Cl. 75—84)
(Granted under Title 35, U.S. Code (1952), sec. 266)

The invention herein described and claimed may be manufactured and used by or for the Government of the United States of America for governmental purposes without the payment of royalties thereon or therefore.

This invention is concerned with the preparation of refractory or other metals in high purity form.

Refractory metals are difficult and costly to produce because reduction of their oxides to metal requires the use of strong reductants and special reaction conditions to avoid impurity contamination. Interstitial impurities of oxygen, nitrogen, hydrogen and carbon are particularly detrimental as the presence of small quantities of these impurities makes the metal brittle and unworkable.

Reduction procedures, such as those employing aluminum, silicon and calcium as reducing agents, have been developed which yield satisfactory metal recovery, but the procedures were abandoned or the use of the metal limited to special applications because the metal was not sufficiently deoxidized or the process was too expensive. The aluminothermic reduction procedure (thermite process), in particular, has been used for the production of refractory metals. However, when a sufficient quantity of excess aluminum is used as reductant to produce metal containing a small amount of oxygen, the resulting metal contains a high percentage of alloyed aluminum as impurity.

It is, therefore, an object of the present invention to provide a process for removal of oxygen and/or aluminum from reduced refractory metals or powders to yield metals of improved quality for direct fabrication or master alloy usage.

It is a further object to provide such a process which is simple and economical.

It has now been found that these objectives may be accomplished by treatment of the impure refractory metal with a combination of aluminum metal, calcium metal and barium peroxide. By means of this treatment a refractory metal product is obtained which contains very low percentages of oxygen and/or alloyed aluminum and is therefore suitable for fabrication or alloy production.

The process of the invention has been found to be particularly effective in preparation of high-purity ductile vanadium and will be described in detail with reference to this metal; however, it is applicable to other refractory metals such as zirconium, tantalum, tungsten, titanium, chromum and molybdenum, which have high melting points and are difficult to produce in a ductile, high-purity form. Theoretically the process is applicable to treatment of the refractory metals that are below aluminum in reducing potential.

The source of the impure vanadium or other impure refractory metal will generally be the low-cost aluminothermically produced metal, though the metal may be from any preliminary procedure which yields a product metal of undesirably high aluminum and/or oxygen content. The process is applicable to metals containing in excess of 2.5% oxygen and 30% aluminum, but optimum results are more readily obtained with metals containing less than half these quantities of impurities.

The refractory metal is employed in pulverized or powdered form. The particle size of the metal is not critical, the optimum size depending on the metal to be treated and reaction conditions. Metal ground to minus-65-mesh is generally used, however, minus-20-mesh metal has also been used satisfactorily.

The aluminum is employed in the form of a fine powder having a mesh size of about 40 to about 400. The barium peroxide ($BaO_2$) is also employed in the form of a powder having a mesh size of about 150 to about 400.

The calcium metal is preferably employed in the form of nodules of ⅛ inch and finer though the exact size is not critical and will again depend on reaction conditions. Large calcium particle size, about ⅛ inch, is utilized to achieve greater elimination of aluminum. In general, the optimum particle size of all the reactants will depend on a variety of factors and is best determined empirically.

The success of the process of the invention in producing a high-purity refractory metal is believed due to the difference in reaction rates between relatively coarse calcium metal and finely divided aluminum metal with barium peroxide. The aluminum (alloyed or free), when intimately mixed with the barium peroxide reacts well ahead of the calcium, the aluminum being almost completely consumed in the reaction despite the presence of an excess of calcium for concurrent and subsequent deoxidation. Reaction of the aluminum, either alloyed or unalloyed, with $BaO_2$ results in formation of $Al_2O_3$ which provides heat to sustain the reaction. The $Al_2O_3$ also serves as a flux for the BaO and CaO, also formed during the reaction, to form a fluid slag that excludes air from the molten pool of refractory metal. $BaO_2$ has been previously used with aluminum to develop a kindling temperature; however, this procedure is in no way analogous to the purification process of the present invention.

Successful application of the invention usually requires close control of the reagent additions, with quantities based on accurate metal analyses. A definite quantity of $BaO_2$ is added, usually in excess of that needed to react with all of the aluminum present (alloyed and unalloyed) according to the following equation:

$$2Al + 3BaO_2 \rightarrow Al_2O_3 + 3BaO$$

This assures the desired elimination and/or control needed to prevent residual aluminum from alloying and also helps provide the necessary heat of reaction. For example, good melt-down and excellent slag separation are obtained when 500 grams of pulverized vanadium metal of low (0.4 to 2.5%) aluminum content is reacted with about 900 grams $BaO_2$ and 60–100 percent of theoretical aluminum, based on the above equation. In reactions with metals of high alloyed-aluminum content with the $BaO_2$ addition is similarly calculated to be in sufficient excess of both alloyed and unalloyed aluminum to provide the required degree of aluminum elimination.

Calcium and aluminum additions are best determined empirically and may vary over a considerable range depending on the metal treated and the extent of deoxidation and aluminum removal that are desired. The amount of calcium should be sufficient to ensure the desired degree of deoxidation while the amount of aluminum should be sufficient to provide the necessary heat of reaction and slag formation as described above. When the metal treated has a sufficiently high alloyed-aluminum content, further addition of aluminum is unnecessary as illustrated in examples 7–12 below.

Only the highest purity reagents should be used to avoid impurity contamination in the metal product. The added aluminum should have a low iron and silicon content; the barium dioxide should have a low carbon and nitrogen content.

A particularly desirable feature of the invention is that the reaction can be carried out in an unlined open steel vessel, thus permitting a substantial savings in material and labor costs. Tests were conducted in both ceramic-lined and unlined 4-inch diameter by 24-inch high reaction vessels made of steel pipe. Higher purity metal was obtained in the unlined vessel. In large scale reactions, of course, the greater heat of reaction, as well as other factors, must be considered in the vessel design. An 8-inch diameter vessel tapering to a rounded bottom of about 4-inches in diameter for metal collection offers a practical design for larger capacity and improved metal collection.

The following examples will serve to more particularly describe the invention.

EXAMPLES 1–12

Reactants, proportions and results are given in Tables 1 and 2. Examples 1–6 (Table 1) relate to open-vessel deoxidation of pulverized vanadium of moderately high oxygen and low aluminum content, while Examples 7–12 (Table 2) relate to open-vessel deoxidation and elimination of aluminum from pulverized vanadium of low oxygen and high aluminum content. The charges were prepared by thoroughly mixing minus 150 mesh $BaO_2$ powder (low in carbon) with the pulverized impure vanadium and the designated quantity of calcium (redistilled, ⅛-inch nodules) and fine, 85 percent minus 100 mesh, aluminum powder.

Either a dynamite fuse or an electrically heated wire coil imbedded or covered with a starting mixture of 15 grams $KClO_3$, 3 grams $BaO_2$, and 4 grams aluminum was used to ignite the reaction. To insure a hot, smooth start, a primer mix of 50 grams $BaO_2$, 6 grams Al, and 10 grams $CaF_2$ was placed evenly over the top surface of the main charge before adding the starting mixture. The reactions were comparatively mild and subdued. Argon gas was used to purge the reaction vessel before charging and to maintain an inert gas cover during the reaction. When the reaction subsided, water was used to cool the outside of the vessel, and shortly thereafter, when the slag had congealed sufficiently, the water was turned inside the vessel and the purging gas shut off.

The sole purpose of the ignition mixture is to ignite the main charge. It plays no part in the reaction and must not be mixed with the essential reactants. The ignition mixture is composed of two parts: A primer composed of 50 grams of $BaO_2$, 6 grams of Al, and 10 grams of $CaF_2$; and a starting mixture of $KClO_3$, $BaO_2$, and Al. The usual practice is to firmly tamp the main charge in the reaction vessel. After leveling off the top of the charge, a thin layer of the primer mixture is spread over the surface of the charge. The starting mixture then is placed on the primer mixture and the end of a dynamite fuse or other device for remote ignition is buried in the starting mixture. The amount of starter mixture use may vary considerably, but should be sufficient to insure a rapid, hot start.

The temperature of the main reaction may exceed 2,000° C.; however, the ignition temperature is much lower and probably does not exceed 600° C. Because the ignition mixture plays no part in the reduction process, many other mixtures and means of igniting the charge can be employed. All that is required of the ignition mixture is that it will raise the temperature of the surface of the charge high enough so that the reaction between the ingredients of the charge is started.

Increases in calcium additions beyond the quantities shown in the tables have been found to increase the alloying of residual aluminum and thereby decrease aluminum rejection from the vanadium metal. However, by decreasing the over-all aluminum content of the feed mixture to 60 percent of the theoretical (amount which reacts with the $BaO_2$), and increasing the calcium, both the oxygen and aluminum were removed to low levels as shown in Example 4, Table 1.

*Table 1*

| Example No. | Charge data [1] | | | | | | | Product data | | | | |
|---|---|---|---|---|---|---|---|---|---|---|---|---|
| | Vanadium pulverized to 65-mesh | | Reductant | | | | Weight, grams $BaO_2$ [3] | Recovery | | Metal analysis, percent | | |
| | Weight, grams | Analysis, percent | | Weight grams | | Theoretical, percent [2] | | | Metal weight, grams | Vanadium, percent | $O_2$ | Al | $N_2$ |
| | | $O_2$ | Al | Al | Ca | Al | Ca | | | | | | |
| 1 | 500 | 2.5 | 0.4 | 96 | 170 | 100 | 80 | 900 | 515 | 94 | 0.09 | 2.5 | |
| 2 | 500 | 1.0 | 2.1 | 81 | 182 | 85 | 115 | 900 | 453 | 91 | .085 | 3.7 | |
| 3 | 500 | 1.8 | .5 | 72 | 170 | 75 | 80 | 900 | 463 | 93 | .16 | 1.2 | |
| 4 | 1,000 | 1.7 | .4 | 114 | 408 | 60 | 95 | 1,800 | 875 | 88 | .11 | .7 | 0.05 |
| 5 | 500 | 1.8 | .4 | 72 | 149 | 75 | 70 | 900 | 465 | 94 | .20 | .6 | .06 |
| 6 | 1,500 | 1.5 | .7 | 215 | 448 | 75 | 70 | 2,700 | 1,382 | 92 | .15 | .5 | .06 |

[1] Tests made in 4-inch I.D. by 24-inch high steel pipe reaction vessel lined in bottom with magnesia crucible, except test 4 made in unlined vessel.
[2] Percent of theoretical reductant for available oxygen in $BaO_2$.
[3] Amount of pure $BaO_2$ available for reaction.

*Table 2*

| Example No. | Charge data [1] | | | | | | | Product data | | | | |
|---|---|---|---|---|---|---|---|---|---|---|---|---|
| | Vanadium metals pulverized to 65-mesh | | Reductant | | | | Weight, grams $BaO_2$ [3] | Recovery | | Metal analysis, percent | | |
| | Weight, grams | Analysis, percent | | Weight, grams Ca | Theoretical percent [2] | | | | Metal weight, grams | Vanadium, percent | $O_2$ | Al | $N_2$ |
| | | $O_2$ | Al | | Al | Ca | | | | | | | |
| 7 | 500 | 0.10 | 29.5 | 116 | 85 | 30 | 1,633 | 320 | 90 | 0.14 | 0.7 | |
| 8 | 1,000 | .14 | 32.5 | 605 | 75 | 60 | 4,080 | 708 | 92 | .13 | .8 | |
| 9 | 500 | .16 | 17.4 | 68 | 85 | 30 | 961 | 423 | 95 | .18 | 1.6 | |
| 10 | 500 | .16 | 17.4 | 136 | 85 | 60 | 961 | 447 | 97 | .02 | 4.8 | 0.06 |
| 11 [4] | 500 | .18 | 11.2 | 235 | 60 | 100 | 989 | 440 | 85 | .04 | 2.5 | |
| 12 | 500 | .17 | 31.4 | 206 | 85 | 50 | 1,739 | 311 | 87 | .19 | .5 | .07 |

[1] All tests shown made in 4-inch I.D. steel pipe reaction vessel lined in bottom with magnesia crucible.
[2] Percent of theoretical reductant for available oxygen in $BaO_2$.
[3] Amount of pure $BaO_2$ available for reaction.
[4] Test made on minus 20-mesh metal.

A large increase in BaO$_2$ addition was necessary to eliminate alloyed aluminum from metals assaying about 30% Al, as shown in Examples 7, 8 and 12, Table 2. When the metal treated contained 11 to 17 percent aluminum somewhat less BaO$_2$, about 1,000 grams per 500 grams of metal, was required.

Many innovations and variations will be apparent to those skilled in the art without departure from the spirit and scope of the invention.

What is claimed is:

1. A method for the preparation of a high-purity refractory metal from an impure refractory metal containing as impurities oxygen and a low percentage of alloyed aluminum comprising reacting the impure refractory metal with barium peroxide, metallic calcium and metallic aluminum and recovering a product of high-purity refractory metal containing very small amounts of oxygen and alloyed aluminum.

2. Method of claim 1 in which the refractory metal is from the group consisting of vanadium, zirconium, tantalum, tungsten, titanium, chromium and molybdenum.

3. Method of claim 1 in which the refractory metal is vanadium.

4. Method of claim 1 in which the barium peroxide is in powdered form.

5. Method of claim 1 in which the aluminum is in the form of a fine powder.

6. Method of claim 1 in which the calcium is in the form of nodules of about ⅛ inch maximum size.

7. Method of claim 1 in which the barium peroxide is employed in excess of the amount necessary to react with all of the aluminum.

8. Method of claim 1 in which the calcium is employed in an amount sufficient to achieve the desired deoxidation.

9. Method of claim 1 in which the reaction is carried out in an inert atmosphere.

10. Method of claim 1 in which the impure refractory metal is in powdered form.

11. Method of claim 10 in which the impure refractory metal is about minus 65-mesh.

12. A method for the preparation of a high-purity refractory metal from an impure refractory metal containing as impurities oxygen and a high percentage of alloyed aluminum comprising reacting the impure refractory metal with barium peroxide and metallic calcium and recovering a product of high-purity refractory metal containing very small amounts of oxygen and alloyed aluminum.

13. Method of claim 12 in which the refractory metal is from the group consisting of vanadium, zirconium, tantalum, tungsten, titanium, chromium and molybdenum.

14. Method of claim 12 in which the refractory metal is vanadium.

15. Method of claim 12 in which the barium peroxide is in powdered form.

16. Method of claim 12 in which the calcium is in the form of nodules of about ⅛ inch maximum size.

17. Method of claim 12 in which the barium peroxide is employed in an amount necessary to react with all of the alloyed aluminum.

18. Method of claim 12 in which the calcium is employed in an amount sufficient to achieve the desired deoxidation.

19. Method of claim 12 in which the reaction is carried out in an inert atmosphere.

20. Method of claim 12 in which the impure refractory metal is in powdered form.

21. Method of claim 20 in which the impure refractory metal is about minus 65-mesh.

References Cited by the Examiner

UNITED STATES PATENTS

| | | | |
|---|---|---|---|
| 878,210 | 2/08 | Kuhne | 75—27 |
| 1,415,516 | 5/22 | Bridge | 75—84 |
| 1,648,954 | 11/27 | Marden | 75—84 |
| 1,822,506 | 9/31 | Sander | 75—27 |
| 2,789,896 | 4/57 | Coffer | 75—27 |

OTHER REFERENCES

Gregory et al.: Reprint from Journal of the Electro Chemical Society, vol. 98, No. 10, October 1951, pp. 395–399.

CARL D. QUARFORTH, *Primary Examiner.*

REUBEN EPSTEIN, *Examiner.*